(12) United States Patent
Gopalakrishnan et al.

(10) Patent No.: US 11,347,517 B2
(45) Date of Patent: May 31, 2022

(54) REDUCED PRECISION BASED PROGRAMMABLE AND SIMD DATAFLOW ARCHITECTURE

(71) Applicant: INTERNATIONAL BUSINESS MACHINES CORPORATION, Armonk, NY (US)

(72) Inventors: Kailash Gopalakrishnan, New York, NY (US); Sunil Shukla, Scarsdale, NY (US); Jungwook Choi, Chappaqua, NY (US); Silvia Mueller, Altdorf (DE); Bruce Fleischer, Bedford Hills, NY (US); Vijayalakshmi Srinivasan, New York, NY (US); Ankur Agrawal, Chappaqua, NY (US); Jinwook Oh, Fort Lee, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 164 days.

(21) Appl. No.: 16/447,588

(22) Filed: Jun. 20, 2019

(65) Prior Publication Data

US 2020/0401413 A1 Dec. 24, 2020

(51) Int. Cl.
*G06F 9/38* (2018.01)
*G06F 15/80* (2006.01)

(52) U.S. Cl.
CPC .......... *G06F 9/3887* (2013.01); *G06F 9/3814* (2013.01); *G06F 15/8007* (2013.01)

(58) Field of Classification Search
CPC .. G06F 9/3887; G06F 9/3814; G06F 15/8007; G06F 15/82; G06F 15/825
See application file for complete search history.

(56) References Cited

U.S. PATENT DOCUMENTS

| 8,954,943 | B2 | 2/2015 | Eichenberger et al. |
| 9,244,746 | B2 | 1/2016 | Hughes et al. |
| 2018/0197695 | A1 | 7/2018 | Schaller et al. |
| 2019/0236049 | A1* | 8/2019 | Vantrease ........... G06F 15/8046 |

OTHER PUBLICATIONS

Wu, Architectural Synthesis of Multi-SIMD dataflow accelerators for FPGA, Jan. 2018, IEEE transactions on parallel and distributed systems, vol. 29 No. 1, 13 pages (Year: 2018).*
Shen et al, Memory partition for SIMD in streaming dataflow architectures, 2016, IEEE, 978-1-5090-5117-5/16, 8 pages (Year: 2016).*

(Continued)

*Primary Examiner* — Keith E Vicary
(74) *Attorney, Agent, or Firm* — Griffiths & Seaton PLLC

(57) ABSTRACT

A reduced precision based programmable and single instruction multiple data (SIMD) dataflow architecture includes reduced precision execution units with a majority of the execution units operating at reduced precision and a minority of the execution units are capable of operating at higher precision. The execution units operate in parallel within a programmable execution element to share instruction fetch, decode, and issue pipelines and operate on the same instruction in lock-step to minimize instruction-related overhead.

20 Claims, 7 Drawing Sheets

(56) References Cited

OTHER PUBLICATIONS

Wang et al, Streaming elements for FPGA signal and image processing accelerators, Jun. 2016, IEEE transactions on very large scale integration systems, vol. 24 No. 6, 13 pages (Year: 2016).*

Chen et al, Graph Minor Approach for Application Mapping on CGRAs, 2012, 978-1-4673-2845-6/12, 8 pages (Year: 2012).*

Petersen, A. et al.; "Reducing Control Overhead in Dataflow Architecture" Computer Science & Engineering University of Washington. Sep. 2006 ( 10 Pages ).

Shahbahrami, A. et al.; "SIMD Architectural Enhancements to Improve the Performance of the 2D Discrete Wavelet Transform" Aug. 2009 ( 9 Pages ).

IPCOM000232481D; "Capture and Display of Performance Provile for Dataflow Graph" Authors et. al.: Disclosed Anonymously Nov. 11, 2013 ( 4 Pages ).

IPCOM000200609D; "Dataflow Optimization to Remove Redundant Guards in Cooperatively Multithreaded Code" Authors et. al.: Disclosed Anonymously IP.com Electronic Publication Date: Oct. 20, 2010 (4 Pages ).

IPCOM000188267D; "Dataflow Machine Emulator Running on Top of Shared Memory Multi-Core Computer" Authors et. al.: Siemens, Juergen Carstens. Original Publication Date: Oct. 14, 2009, IP.com Electronic Publication Date: Oct. 14, 2009 ( 3 Pages ).

\* cited by examiner

REDUCED PRECISION BASED PROGRAMMABLE AND SIMD DATAFLOW ARCHITECTURE

BACKGROUND OF THE INVENTION

Field of the Invention

The present invention relates in general to computing systems, and more particularly to, various embodiments for implementing a reduced precision based programmable and single instruction multiple data (SIMD) dataflow architecture in a computing environment by a processor.

Description of the Related Art

In today's society, consumers, business persons, educators, and others use various computing network systems with increasing frequency in a variety of settings. Computer systems may be found in the workplace, at home, or at school. Computer systems may include data storage systems, or disk storage systems, to process and store data. In recent years, both software and hardware technologies have experienced amazing advancement. With the new technology, more and more functions are added, and greater convenience is provided for use with these computing systems.

SUMMARY OF THE INVENTION

Various embodiments for implementing a reduced precision based programmable and single instruction multiple data (SIMD) dataflow architecture using one or more processors in a computing environment are provided. In one embodiment, by way of example only, a method for using a reduced precision based programmable SIMD-DF architecture in a computing environment, again by a processor, is provided. In one embodiment, there are one or more instructions between a plurality of execution units (EUs) operating in parallel within each one of a plurality of execution elements (EEs).

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
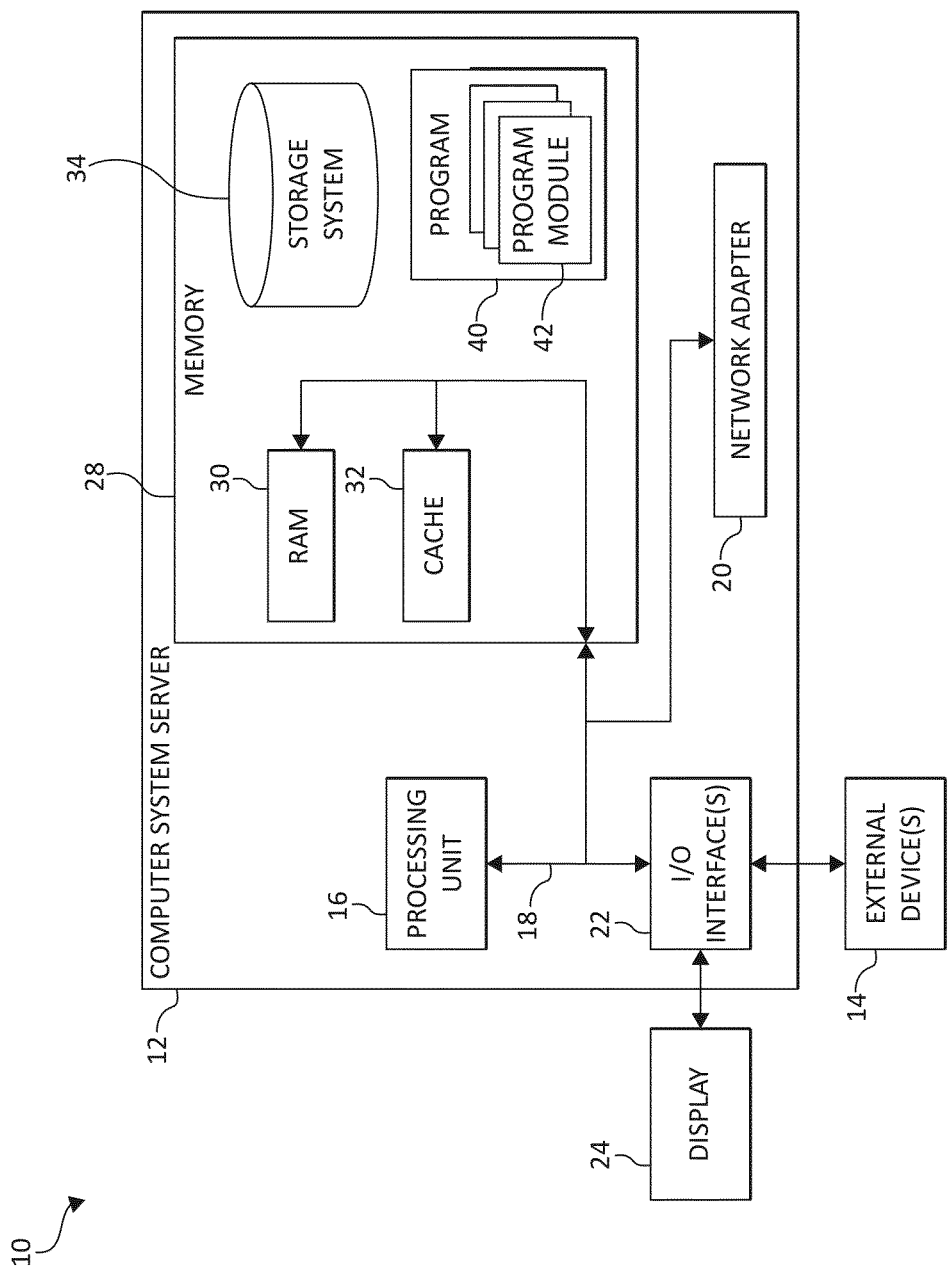
FIG. 1 is a block diagram depicting an exemplary computing node according to an embodiment of the present invention.

As a preliminary matter, a data network facilitates data transfers or "data flows" between two or more data processing systems in a computing environment (e.g., a dataflow architecture). For example, an application executing in one data processing system acts as the sender of the data, and another application executing in another data processing system acts as the receiver of the data. Between the sender system and the receiver system, the data follows a data path that comprises a series of links between networking components, such as routers and switches. A link is also known as a hop. For example, a data network exists between a network interface in the sender system and a network interface in the receiver system.

Additionally, a computing environment may execute a deep learning application comprised of one or more kernels which are embarrassingly data parallel. Deep learning applications are very compute intensive. With the widespread use of machine/deep learning, there can be additional constraints such as, for example, having short response times for inference, and being able to speed up training to allow a computer system to adapt to a changing world all while performing in an efficient manner. Thus, special hardware acceleration is required beyond just using graphics processing units ("GPUs") to significantly improve overall performance (e.g., response time and/or throughput), performance per Watt ("p/W"), and performance per chip area ("p/cm$^2$"). There are several application domains such as, for example, image classification, temporal sequences, natural language processing/classification ("NLP"), or speech phoneme classification.

Depending on the application domain, 70-90% of the time during the machine learning (e.g., deep learning) may be spent in matrix-vector operations. However, there are also operations such as, for example, pooling or calculating one or more activation functions that spend a significant amount of time in mathematical functions such as, for example, add, subtract, multiple, divide, square root, logarithm, and exponent. In order to obtain a performance per unit watt improvement over GPUs, the computing overheads in SIMD and SIMT architectures may be analyzed.

In the SIMD and SIMT architectures, there is an excess amount of area and power spent in wiring (e.g., routing) and shared register-files. GPUs also have computing overheads required to support a large number of threads at any instance in time, which is critical in graphical applications in order to hide memory latencies. However, in many emerging machine learning and deep-learning applications, data access patterns may be predictable making it possible to significantly reduce these overheads.

Possible alternatives to SIMD architectures are Programmable Dataflow (DF) architectures. A Programmable DF architecture may contain a significant number of independent execution units with private register files instead of centralized shared register files and lock-step (SIMD) operation. In Programmable DF architectures, exchange of data between neighboring (or sets of) execution units is accomplished through First-In-First-Out ("FIFO") structures, output register files etc. The challenge with Programmable DF architectures is that each execution unit typically comes with its own instruction-set and has instruction overheads associated with instruction-storage, fetch, decode, issue etc. This challenge is exacerbated when considering an architecture optimized for machine-learning/deep learning where the execution units can be implemented in reduced precision and can therefore be relatively small in area and power. In this domain, the instruction overheads in DF architectures can dominate the overall area and power and can significantly reduce the benefits of reduced precision implementation.

Accordingly, the present invention provides for a reduced precision based programmable and single instruction multiple data (SIMD) dataflow architecture (SIMD-DF architecture) using one or more processors in a computing environment. The reduced precision based programmable SIMD-DF architecture combines the advantages of SIMD architectures with programmable DF architectures to minimize instruction overheads and to eliminate shared register-files and communication overheads, respectively, in order to improve the performance and performance/watt.

A reduced precision based programmable SIMD-DF architecture (e.g., a "reduced precision based programmable and SIMD dataflow architecture") may use reduced precision execution units with a majority of the execution units computing in reduced precision and a minority of the execution units can also compute in higher precision. Due to the programmability of the enhanced programmable SIMD-DF architecture, each execution unit may have its own instruction-set and is capable of executing a stored program (and the overall enhanced reduced precision based programmable SIMD-DF architecture is also capable of executing a stored program). In this way, the reduced precision based programmable SIMD-DF architecture minimizes the area and power footprint of the execution unit (and the overall architecture) in comparison to an architecture built with higher precision units.

In an additional aspect, the reduced precision based programmable SIMD-DF architecture amortizes various functions (e.g., instruction overheads such as, for example, instruction fetch, decode, issue etc.) by having one or more execution units ("EUs" or reduced precision execution "RPE" units) operating in parallel (i.e., in SIMD mode) within each execution element ("EE" or programmable element "PE") to reduce performance costs and reduce the area and the power needed to perform these functions in comparison to the area and the power of the execution unit. The RPEs operate (in SIMD mode) within each programmable element (PE). That is, each EE/PE may include multiple EUs/RPEs. The RPEs share the instruction fetch, decode and issue pipeline (e.g., share the instruction overhead workloads and data path). In other words, there are multiple execution units ("EU" or RPE) within each EE (e.g., PE) and each EE operates on the same instruction in lock-step to minimize instruction-related overheads. Finally, an overall data path width is now a combined data path width associated with the multiple RPEs within each PE. This allows control overheads of communication channels between EE and other elements in the system to be minimized as well.

In one embodiment, one or more instructions may be shared between a plurality of execution units (EUs) operating in parallel within each one of a plurality of execution elements (EEs). The reduced precision based programmable SIMD-DF architecture may enable a majority of the compute operations (or data crunching) to operate in reduced precision and a minority of the compute operations to operate in high precision.

Also, as used herein, a computing system may include large scale computing called "cloud computing" in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

It should be noted that one or more computations or calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
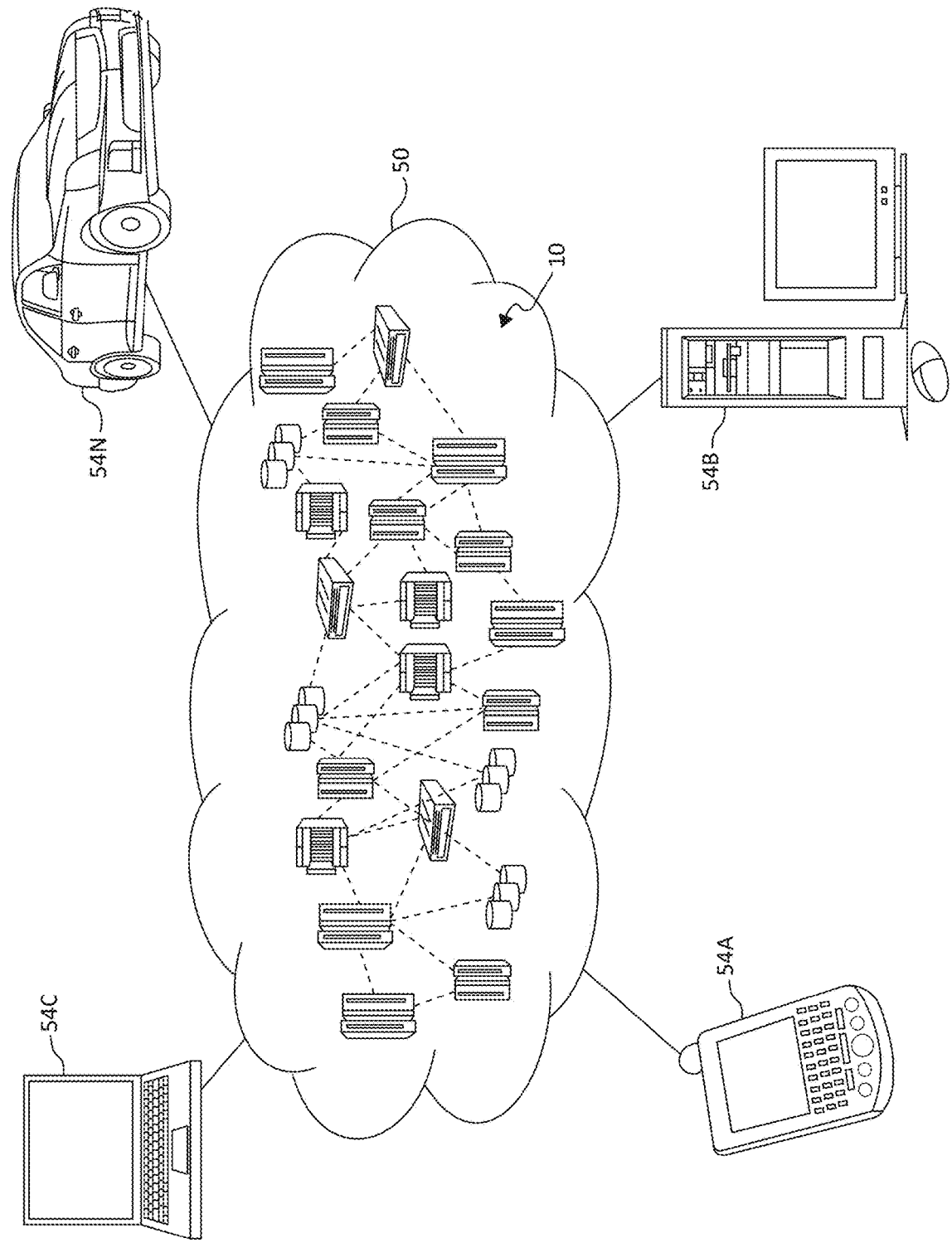
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
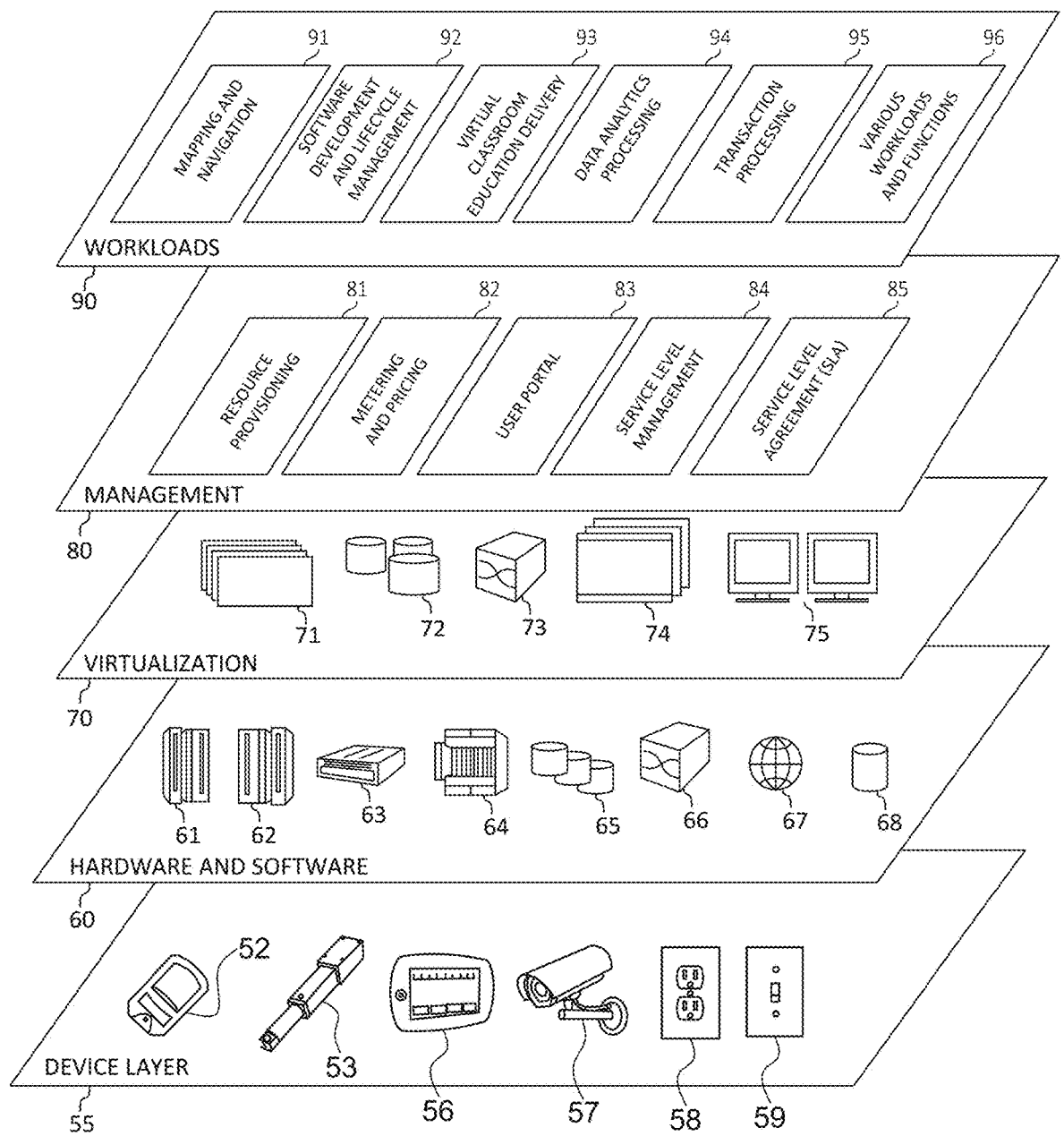
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for implementing a reduced precision based programmable SIMD-DF architecture. In addition, workloads and functions 96 for implementing a reduced precision based programmable SIMD-DF architecture may include such operations as data analytics, data analysis, and as will be further described, cryptographic switching functionality. One of ordinary skill in the art will appreciate that the workloads and functions 96 for implementing a reduced precision based programmable SIMD-DF architecture may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
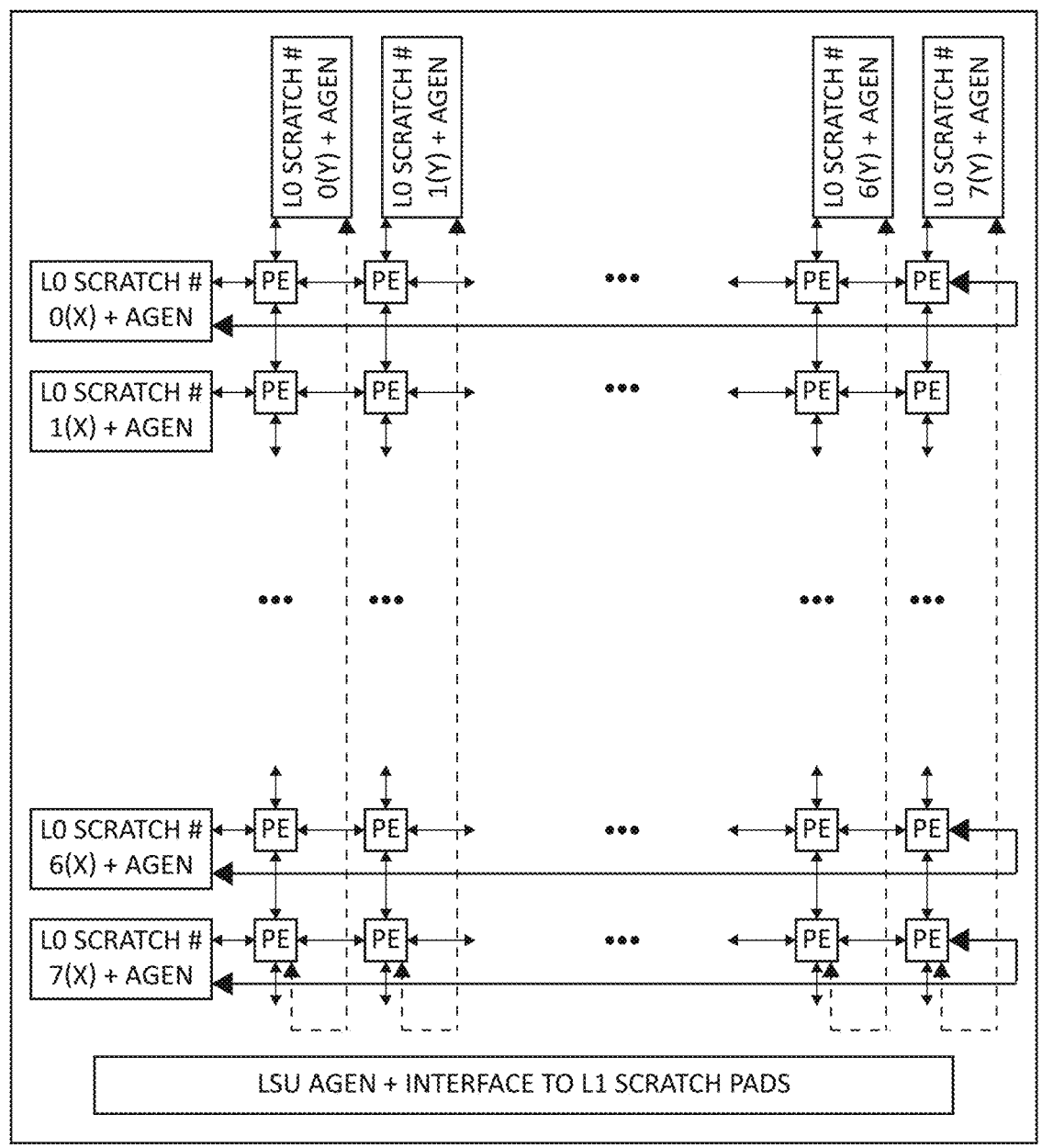
FIG. 4 is an additional block diagram depicting dataflow architecture in which aspects of the present invention may be realized.

Turning now to FIG. 4, a block diagram depicts a reduced precision based programmable SIMD-DF architecture 400 in which illustrative embodiments may be implemented. In one aspect, one or more of the components, modules, services, applications, and/or functions described in FIGS. 1-3 may be used in FIG. 4. The core architecture captures a customized reduced precision based programmable SIMD-DF with scratchpad memory.

As illustrated, the reduced precision based programmable SIMD-DF architecture 400 may include one or more of a variety of compute node/units such as, for example, those compute nodes labeled by way of example only as L0 such as, for example, L0 Scratch #0(X)+AGEN, L0 Scratch #1(X)+AGEN, . . . , L0 Scratch #6(X)+AGEN, and L0 Scratch #7(X)+AGEN, and also L0 Scratch #0(Y)+AGEN, L0 Scratch #1(Y)+AGEN, . . . , L0 Scratch #6(Y)+AGEN, and L0 Scratch #7(Y)+AGEN, and one or more processing element (PE). More specifically, each of the PEs are connected to each of the four nearest neighbors, which may include the compute nodes L0 such as, for example, L0 Scratch #0(X)+AGEN, L0 Scratch #1(X)+AGEN, . . . , L0 Scratch #6(X)+AGEN, and L0 Scratch #7(X)+AGEN, and also L0 Scratch #0(Y)+AGEN, L0 Scratch #1(Y)+AGEN, . . . , L0 Scratch #6(Y)+AGEN, and L0 Scratch #7(Y)+AGEN.

The compute nodes L0 such as, for example, L0 Scratch #0(X)+AGEN, L0 Scratch #1(X)+AGEN, . . . , L0 Scratch #6(X)+AGEN, and L0 Scratch #7(X)+AGEN, and also L0 Scratch #0(Y)+AGEN, L0 Scratch #1(Y)+AGEN, . . . , L0 Scratch #6(Y)+AGEN, and L0 Scratch #7(Y)+AGEN may be connected to each of the two nearest neighbors PEs.

In one aspect, the reduced precision based programmable SIMD-DF architecture 400 may include multiple execution elements (EE), which may be the PEs. Each EE supports its own instruction-set (ISA), has its instruction buffer (e.g., an "IBuff" needed to store a program) and is capable of performing a set of tasks, which may be defined by the ISA. Each EE/PE may have input and output connections to a subset of other EEs/PEs that allow the EE/PE to exchange the data with other EEs/PEs. These exchanges may be facilitated through register-files (shared between the sets of EEs) or through one or more First-In First-Out ("FIFO") connections. Data that is exchanged may be an input passed to an output connection or the result of the computation passed to the output connection. The EEs may also include other forms of local storage such as, for example, register files, scratch-pads (e.g., private memories), and/or caches. The ISA in each EE allows it access to the input and output connections, private local storage, execute different kinds of computations as well as control-flow (e.g., loop-related) semantics. Each EE/PE is programmable and executes a program that is stored inside its IBuff.

In addition, the EE also may include one or more state machines to perform various tasks such as, for example, initializing the IBuff, performing various debug modes, and logging out the data (in case of an execution error).

In one aspect, the reduced precision based programmable SIMD-DF architecture 400 may include ISA support for both systolic and dataflow connections. Also, the execution unit (EU) in a selected number of the EEs/PEs (e.g., a majority of the EEs/PEs) is in reduced precision where the reduced precision is defined as less than or equal to 16 bits of operation. This implies that the majority of the EEs/PEs operate on input operands that are less than or equal to 16 bits and produces an output data that is less than or equal to 16 bits.

In one aspect, each EE (e.g., the PE) may operate on and produce reduced precision data for machine learning/deep learning since it significantly reduces the area and power for the EE and the overall reduced precision based programmable SIMD-DF architecture 400. The types of reduced precision supported may include, but are not limited to, reduced precision floating-point representations, reduced precision fixed point representations, binary, ternary and quaternary representations. In some embodiments, the EEs (e.g., the PEs) may support operands with different reduced precision formats (e.g., mixed precision) and produce outputs of a yet another reduced precision format. For example, a reduced precision floating point compare instruction may operate on reduced precision floating point input data but may also produce a binary or reduced-precision fixed-point output.

In one aspect, each EE may contain multiple EUs where each EU may execute the same instruction but operate on different data elements (each data element still being in reduced precision) so as to avoid the reduced precision based programmable SIMD-DF architecture 400 from incurring significant area and power overheads such as for example, computing resource overhead from performing the instruction-fetch, instruction-decode, instruction-execute and using loop-related (control-flow) hardware.

That is, the reduced precision based programmable SIMD-DF architecture 400 is a SIMDized Programmable DF architecture where the number of SIMD elements may range from 2 to 64 and where a larger number significantly minimizes the overheads but also requires greater parallelism in the underlying application and instruction stream. Different EUs (operating on different reduced precision sizes) on the same computing processor may have different number of SIMD elements.

In one aspect, there may be one or more various types of EEs in the overall reduced precision based programmable SIMD-DF architecture 400. For example, one type of EE may be (a) a reduced precision compute EE (which may be referred to herein as a "PE"). The primary role of the reduced precision compute EE is to perform reduced precision arithmetic or logical computation based on input operands and instruction types and may implement a subset of all instructions that operate on reduced precision data including but not limited to addition, multiplication, subtraction, division, logical operations (e.g., AND, OR, NOT, XOR, XNOR, NAND, NOR), fused multiply-addition, fused multiply-subtraction, fused negative-multiply subtraction, exponent extraction, exponent modification, and type-conversions between different instructions.

In one aspect, the majority of the EEs are PEs. Each PE may include control-flow related instructions and hardware. Each PE may include hardware to support one or more peripheral functions.

In an additional example, another type of EE may be (b) a higher-precision compute EE (also referred to as a Special Functional units, or "SFU"). The primary role of the higher-precision compute EEs is to perform higher-precision arithmetic or logical computations based on input and instruction types. The higher-precision compute EEs may implement a subset of all instructions that operate on higher precision data including, but not limited to, addition, multiplication, subtraction, division, logical operations (e.g., AND, OR, NOT, XOR, XNOR, NAND, NOR), fused multiply-addition, fused multiply-subtraction, fused negative-multiply subtraction, exponent extraction, exponent modification, and/or type-conversions between different instructions.

The minority of the EEs are expected to be SFUs (e.g., higher-precision compute EEs). Each SFU may include control-flow related instructions and hardware. Each SFU may also include hardware to support one or more peripheral functions In an additional example, another type of EE may be (c) load and store PEs (also referred to as Address Generation Engines=AGE). The primary role of the AGE is to perform load or store operations on its local (private) memory (also referred to as scratch-pads or caches) and pass on the results to one or more neighboring EEs (in the case of load instructions) and pull results or data from neighboring EEs (in the case of store instructions). The AGEs may also include additional support for data manipulation and processing such as, for example, limited logical and arithmetic operations and/or random number generations, but predominantly function to load and store data. Each AGE may also include computing hardware to support all peripheral functions (including state machines for forwarding). The AGE may also implement synchronization instructions to implement load-store ordering, program execution synchronization, and other critical program constructs. Finally, the size of the scratch-pads will dictate the size of the load or store address produced by the AGE units. The load and store AGEs can also support loading and storing of data of different precision (sizes).

In one aspect, the PE compute nodes may be responsible for most, if not all, the computational operations. The other compute nodes such as, for example, the L0X0-1, LX0-1, and L0Y0-1 facilitate in data transfer by bringing data in from a scratchpad memory to enable a compute structure formed by an array of the PE compute nodes labeled as PE00-11 to work upon/execute the data based on a set of instructions.

Figure 5:
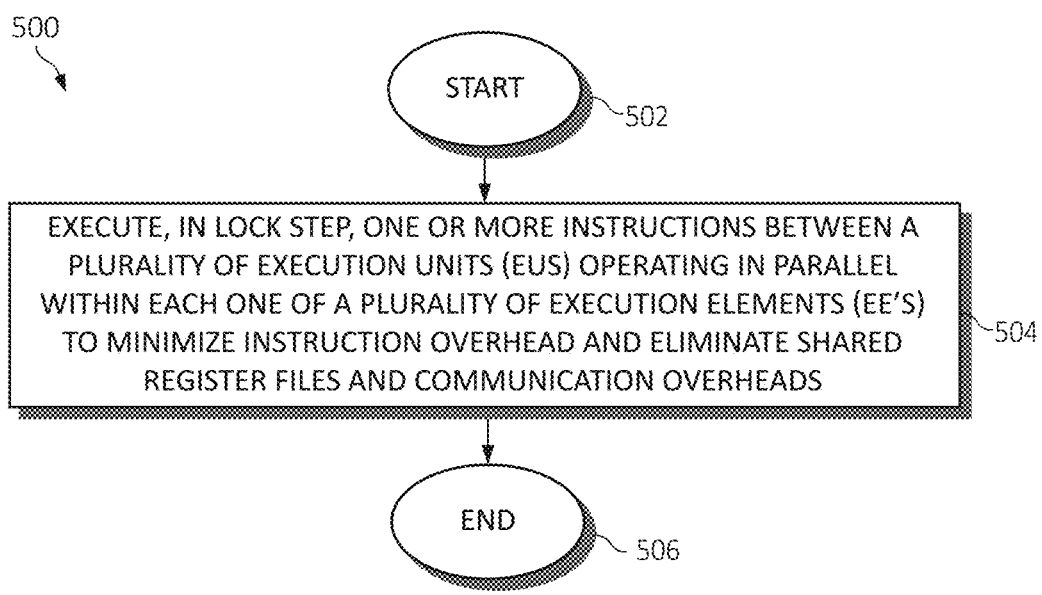
FIG. 5 is a flowchart diagram depicting an exemplary method for implementing a reduced precision based programmable and single instruction multiple data (SIMD) dataflow architecture in a computing environment in which aspects of the present invention may be realized.

Turning now to FIG. 5, a method 500 for implementing using a reduced precision based programmable and single instruction multiple data (SIMD) dataflow architecture in a computing environment by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. The functionality 500 may start in block 502. One or more instructions between a plurality of execution units (EUs) operating in parallel within each one of a plurality of execution elements (EEs) may be executed, in lock step, to minimize instruction overhead and eliminate shared register files and communication overheads, as in block 504. In one aspect, those of the EUs in the same EE are in lock step with other EUs. The functionality 500 may end, as in block 506.

Figure 6:
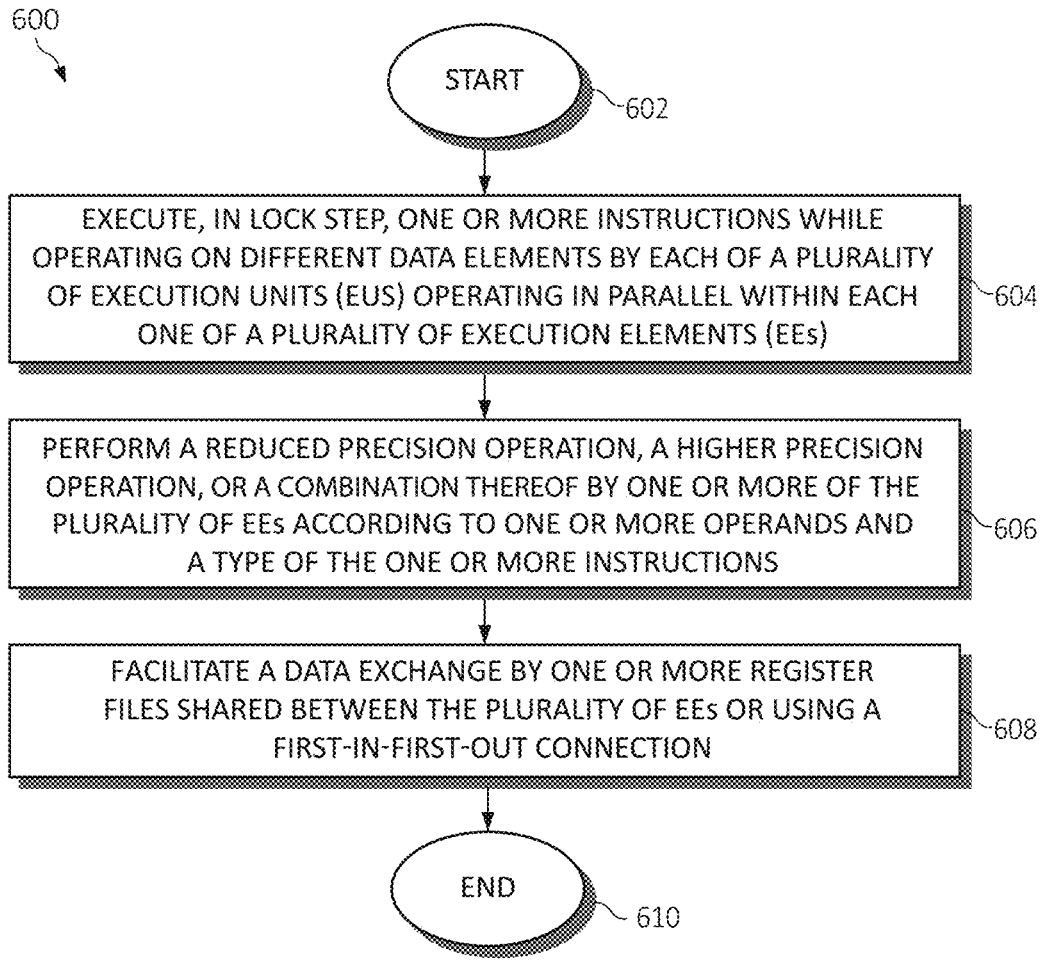
FIG. 6 is a flowchart diagram depicting an additional exemplary method for implementing a reduced precision based programmable and single instruction multiple data (SIMD) dataflow architecture in a computing environment in which aspects of the present invention may be realized.

Turning now to FIG. 6, an additional method 600 for implementing using a reduced precision based programmable and SIMD dataflow architecture in a computing environment by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

One or more instructions may be executed in lock step while operating on different data elements by each of a plurality of EUs operating in parallel within each one of a plurality of EEs, as in block 604. That is, the EUs are in lock step with other EUs in the same EE. A reduced precision operation, a higher precision operation, or a combination thereof may be performed by one or more of the plurality of EEs according to one or more operands and a type of the one or more instructions, as in block 606. A data exchange may be facilitated (e.g., performed) by one or more register files shared between the plurality of EEs or using a first-in-first-out connection, as in block 608. The functionality 600 may end, as in block 610.

Figure 7:
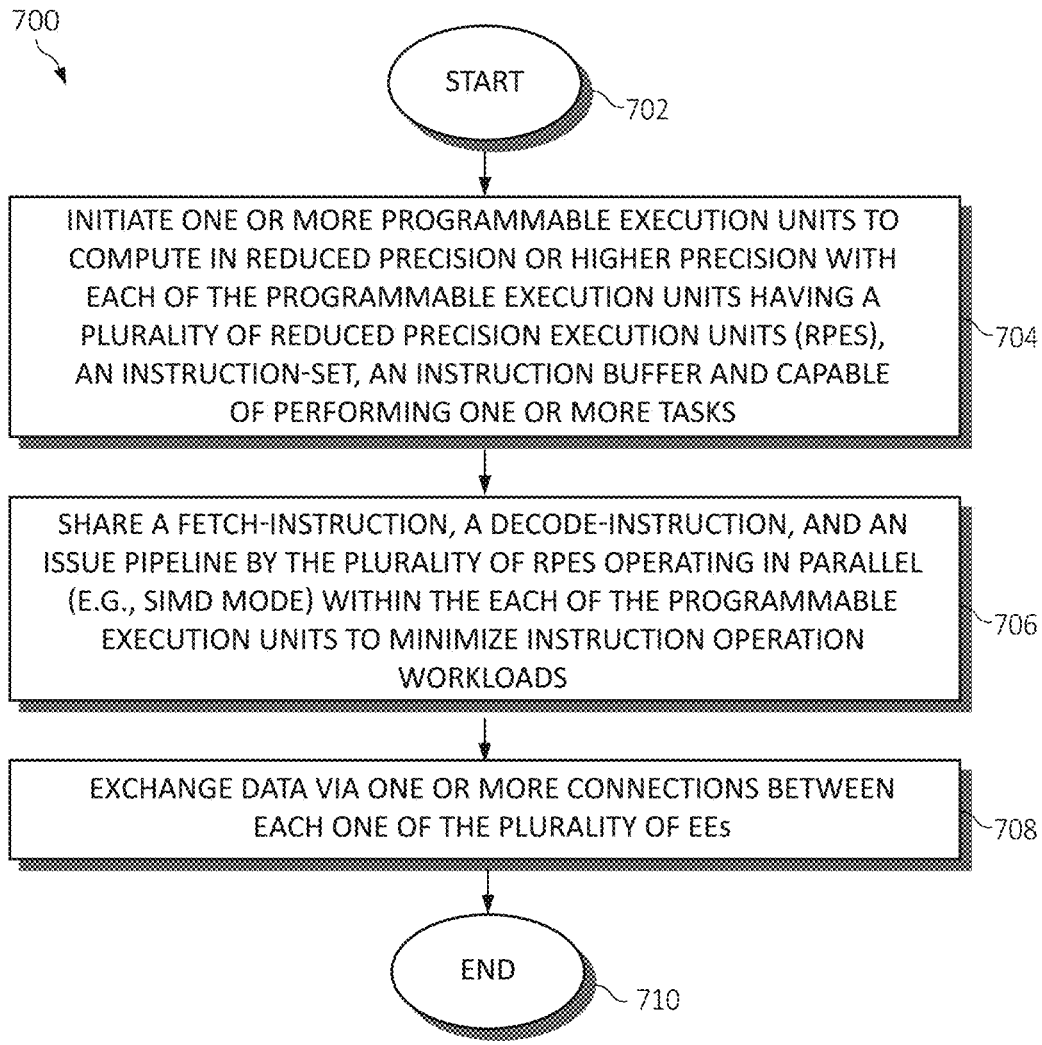
FIG. 7 is a flowchart diagram depicting an additional exemplary method for implementing a reduced precision based programmable and single instruction multiple data (SIMD) dataflow architecture in a computing environment by a processor, again in which aspects of the present invention may be realized.

Turning now to FIG. 7, an additional method 700 for implementing using a reduced precision based programmable and SIMD dataflow architecture in a computing environment by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

One or more programmable execution units may be initiated to compute in reduced precision or in higher precision with each of the programmable execution units having a plurality of RPEs, an instruction-set, an instruction buffer and capable of performing one or more tasks, as in block 704. A fetch-instruction, a decode-instruction, and an issue pipeline may be shared by the plurality of RPEs operating in parallel (e.g., SIMD mode) within the each of the programmable execution units to minimize instruction operation workloads, as in block 706. Data may be exchanged via one or more connections between each one of the plurality of EEs, as in block 708. The functionality 700 may end, as in block 710.

In one aspect, in conjunction with and/or as part of at least one block of FIGS. 5-7, the operations of methods 500, 600, and/or 700 may include each of the following. The operations of methods 500, 600, and/or 700 may exchange data via one or more connections between each one of the plurality of EEs, wherein each of the plurality of EEs include an instruction buffer and supports an instruction-set-architecture (ISA), and facilitate the data exchange by one or more register files shared between the plurality of EEs or using a first-in-first-out connection.

The operations of methods 500, 600, and/or 700 may execute, in lock step, the one or more instructions while operating on different data elements by each of the plurality of EUs. The operations of methods 500, 600, and/or 700 may perform a reduced precision operation by one or more of the plurality of EEs according to operands and types of the one or more instructions, and/or perform a higher precision operation by one or more of the plurality of EEs according to one or more operands and types of the one or more instructions, wherein the one or more of the plurality of EEs performing the higher precision operation are special functional units (SFUs).

The operations of methods 500, 600, and/or 700 may load and store one or more operations on a memory medium by one or more of the plurality of EEs, send results of the one or more operations from one of the plurality of EEs to an alternative one of the plurality of EEs, and/or receive results of the one or more operations by one of the plurality of EEs from an alternative one of the plurality of EEs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing a reduced precision based programmable and single instruction multiple data (SIMD) dataflow architecture in a computing environment by a processor, comprising:
   executing, in lock step, one or more instructions between a plurality of execution units (EUs) operating in parallel within each one of a plurality of execution elements (EEs), wherein a first number of the plurality of EEs operate at a reduced precision while simultaneously a second number of the plurality of EEs operate at a higher precision relative to the reduced precision, the first number comprising a majority of the plurality of EEs and the second number comprising a minority of the plurality of EEs.

2. The method of claim 1, further including exchanging data via a direct connection between a pair of the plurality of EEs, wherein each of the plurality of EEs include includes an instruction buffer and supports an instruction-set-architecture (ISA).

3. The method of claim 1, further including facilitating a data exchange by one or more register files shared between the plurality of EEs or using first-in- first-out (FIFO) connections, wherein the FIFO connections carry one or more data values in parallel.

4. The method of claim 1, further including executing, in lock step, the one or more instructions by each of the plurality of EUs while operating on different data elements, wherein each of the plurality of EUs are in lock step with each other in the same one of the plurality of EEs.

5. The method of claim 1, further including performing a reduced precision operation by one or more of the first number of the plurality of EEs according to operands and types of the one or more instructions.

6. The method of claim 1, further including performing a higher precision operation, relative to a reduced precision operation, by one or more of the second number of the plurality of EEs according to one or more operands and types of the one or more instructions, wherein the one or more of the second number of the plurality of EEs performing the higher precision operation are special functional units (SFUs).

7. The method of claim 1, further including:
   storing one or more data values on a memory medium by one or more of the plurality of EEs;
   sending the one or more data values from one of the plurality of EEs to an alternative one of the plurality of EEs; or receiving the one or more data values by one of the plurality of EEs from an alternative one of the plurality of EEs.

8. A system for implementing a reduced precision based programmable and single instruction multiple data (SIMD) dataflow architecture in a computing environment, comprising:
   one or more computers with executable instructions that, when executed by a processor of the one or more computers, cause the processor to:
   execute, in lock step, one or more instructions between a plurality of execution units (EUs) operating in parallel within each one of a plurality of execution elements (EEs), wherein a first number of the plurality of EEs operate at a reduced precision while simultaneously a second number of the plurality of EEs operate at a higher precision relative to the reduced precision, the first number comprising a majority of the plurality of EEs and the second number comprising a minority of the plurality of EEs.

9. The system of claim 8, wherein the executable instructions, when executed by the processor, cause the processor to exchange data via a direct connection between a pair of the plurality of EEs, wherein each of the plurality of EEs include includes an instruction buffer and supports an instruction-set-architecture (ISA).

10. The system of claim 8, wherein the executable instructions, when executed by the processor, cause the processor to facilitate a data exchange by one or more register files shared between the plurality of EEs or using first-in-first-out (FIFO) connections, wherein the FIFO connections carry one or more data values in parallel.

11. The system of claim 8, wherein the executable instructions, when executed by the processor, cause the processor to execute, in lock step, the one or more instructions by each of the plurality of EUs while operating on different data elements, wherein each of the plurality of EUs are in lock step with each other in the same one of the plurality of EEs.

12. The system of claim 8, wherein the executable instructions, when executed by the processor, cause the processor to perform a reduced precision operation by one or more of the first number of the plurality of EEs according to operands and types of the one or more instructions.

13. The system of claim 8, wherein the executable instructions, when executed by the processor, cause the processor to perform a higher precision operation, relative to a reduced precision operation, by one or more of the second number of the plurality of EEs according to one or more operands and types of the one or more instructions, wherein the one or more of the second number of the plurality of EEs performing the higher precision operation are special functional units (SFUs).

14. The system of claim 8, wherein the executable instructions, when executed by the processor, cause the processor to:
   store one or more data values on a memory medium by one or more of the plurality of EEs;
   send the one or more data values from one of the plurality of EEs to an alternative one of the plurality of EEs; or
   receive the one or more data values by one of the plurality of EEs from an alternative one of the plurality of EEs.

15. A non-transitory computer-readable storage medium having computer-readable program code portions stored therein for implementing a reduced precision based programmable and single instruction multiple data (SIMD) dataflow architecture, the computer-readable program code portions comprising executable instructions that, when executed by a processor, cause the processor to:
   execute, in lock step, one or more instructions between a plurality of execution units (EUs) operating in parallel within each one of a plurality of execution elements (EEs), wherein a first number of the plurality of EEs operate at a reduced precision while simultaneously a second number of the plurality of EEs operate at a higher precision relative to the reduced precision, the first number comprising a majority of the plurality of EEs and the second number comprising a minority of the plurality of EEs.

16. The non-transitory computer-readable storage medium of claim 15, wherein the executable instructions, when executed by the processor, cause the processor to further exchange data via a direct connection between a pair of the plurality of EEs, wherein each of the plurality of EEs include includes an instruction buffer and supports an instruction- set-architecture (ISA).

17. The non-transitory computer-readable storage medium of claim 15, wherein the executable instructions, when executed by the processor, cause the processor to further facilitate a data exchange by one or more register files shared between the plurality of EEs or using first-in-first-out (FIFO) connections, wherein the FIFO connections carry one or more data values in parallel.

18. The non-transitory computer-readable storage medium of claim 15, wherein the executable instructions, when executed by the processor, cause the processor to further execute, in lock step, the one or more instructions by each of the plurality of EUs while operating on different data elements, wherein each of the plurality of EUs are in lock step with each other in the same one of the plurality of EEs.

19. The non-transitory computer-readable storage medium of claim 15, wherein the executable instructions, when executed by the processor, cause the processor to further:

perform a reduced precision operation by one or more of the first number of the plurality of EEs according to operands and types of the one or more instructions; or perform a higher precision operation, relative to a reduced precision operation, by one or more of the second number of the plurality of EEs according to one or more operands and types of the one or more instructions, wherein the one or more of the second number of the plurality of EEs performing the higher precision operation are special functional units (SFUs).

20. The non-transitory computer-readable storage medium of claim 15, wherein the executable instructions, when executed by the processor, cause the processor to further:

store one or more data values on a memory medium by one or more of the plurality of EEs;

send the one or more data values from one of the plurality of EEs to an alternative one of the plurality of EEs; or receive the one or more data values by one of the plurality of EEs from an alternative one of the plurality of EEs.

* * * * *